UNITED STATES PATENT OFFICE.

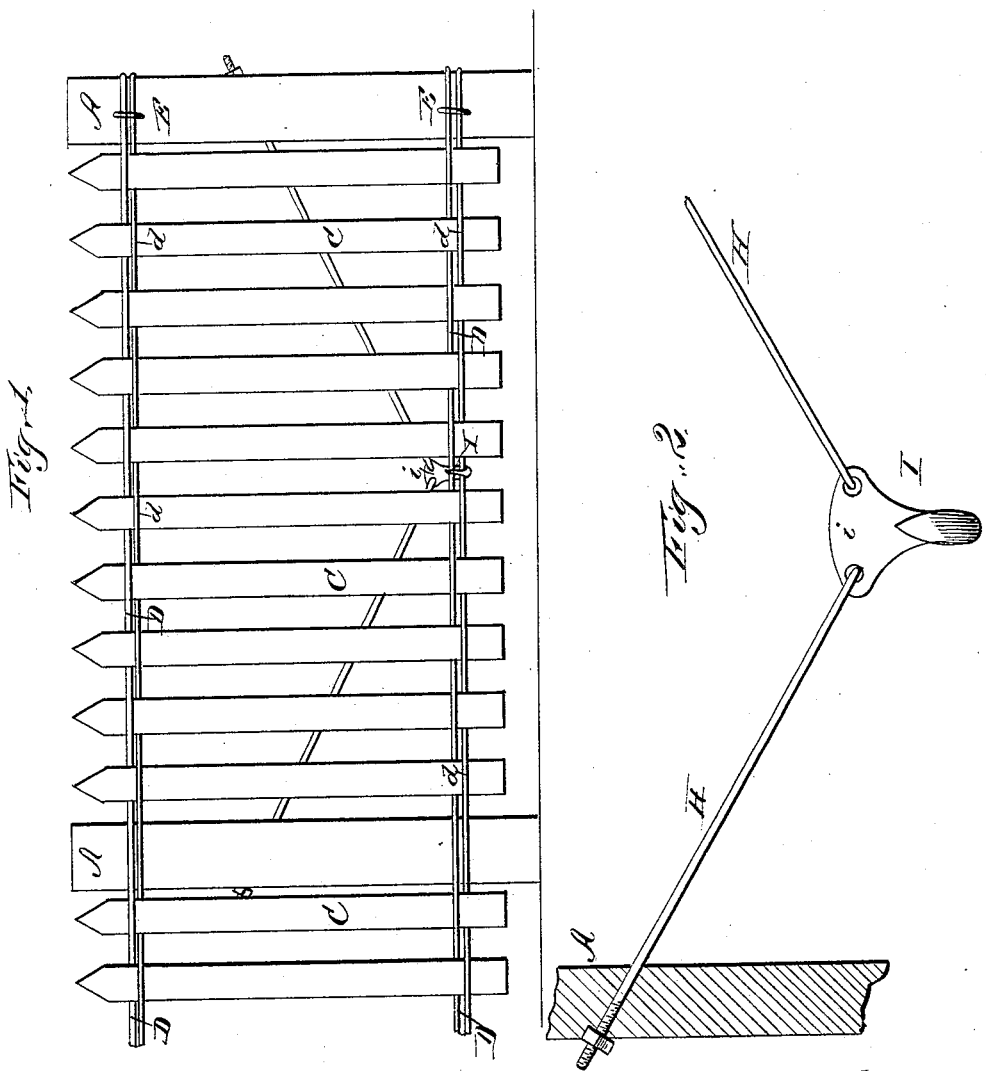

DANIEL COLBERT, OF SULLIVAN, AND DAVID M. MONICAL, OF ORANGE-VILLE, INDIANA.

FENCE.

SPECIFICATION forming part of Letters Patent No. 246,464, dated August 30, 1881.

Application filed June 30, 1881. (No model.)

*To all whom it may concern:*

Be it known that we, DANIEL COLBERT and D. M. MONICAL, the former of Sullivan, Sullivan county, and the latter of Orangeville, in the county of Orange, and State of Indiana, have invented certain new and useful Improvements in Fences; and we do hereby declare that the following is a full, clear, and exact description thereof, reference being had to the accompanying drawings, and to the letters of reference marked thereon, which form part of this specification.

This invention has for its object to provide improved means for securing a line of connected pickets to the fence-posts, as hereinafter described, and illustrated in the drawings, in which—

Figure 1 is a side elevation of our fence, and Fig. 2 is a perspective view of the stay-rods.

Let A A indicate the posts, which are secured in the ground, as usual, and C C the pickets. The pickets, whether vertical or inclined, are connected by means of wires D, which are woven or passed in and out of the line of pickets, two wires being arranged in such manner near the top ends, and two wires being arranged in like manner near the bottom ends of the pickets. These wires cross each other at points between the pickets and constitute loops $d$, which firmly embrace the pickets, so as to hold the same and maintain them at equal distances apart. The wires, at their ends, are wound around the end posts, and secured thereto at their extremities by means of ordinary staples, E. We support the line of pickets between two posts by means of a pair of inclined rods, H H, passing through the posts at their upper ends, and provided with nuts arranged on screw-threaded portions of the rods, so as to be adapted to be tightened up against the posts. These rods incline downwardly from the posts and toward a central point between the same, at which point their lower hook-shaped ends are engaged with an eye, $i$, that is formed in the shank of a hook, I. This hook is engaged with the two lower wires at a point between two of the pickets. By this means the greater portion of the weight of the pickets will be transferred to these supporting-rods, the length of which can be varied by adjusting the nuts thereon, and thereby the line of pickets raised to the required height above the ground.

By this arrangement the pickets are prevented from sagging, and may conveniently and easily be removed and replaced in the event of breakage or when it is desired to form a gate or passage-way at any particular section of the fence.

Having thus described our invention, what we claim, and desire to secure by Letters Patent, is—

The combination, in a fence, of the pickets, held apart by wires, with the inclined rods H, adjustably connected with the fence-posts, and provided with hooks at their lower meeting ends, and the hook I, engaging the wire at the lower part of the series of pickets, and provided with an eye in its shank, receiving the hooks of the inclined rods, substantially as described.

In testimony that we claim the foregoing as our own we affix our signatures in presence of two witnesses.

DANIEL COLBERT.
DAVID M. MONICAL.

Witnesses:
L. WELSHOUS,
A. K. WILSON.